(12) United States Patent
Aubry

(10) Patent No.: US 9,348,415 B2
(45) Date of Patent: May 24, 2016

(54) CONTROL DEVICE WITH HAPTIC FEEDBACK

(71) Applicant: DAV, Creteil (FR)

(72) Inventor: Anthony Aubry, La Muraz (FR)

(73) Assignee: DAV, Créteil (FR)

( * ) Notice: Subject to any disclaimer, the term of this patent is extended or adjusted under 35 U.S.C. 154(b) by 10 days.

(21) Appl. No.: 14/368,340

(22) PCT Filed: Dec. 20, 2012

(86) PCT No.: PCT/FR2012/000545
§ 371 (c)(1),
(2) Date: Jun. 24, 2014

(87) PCT Pub. No.: WO2013/098492
PCT Pub. Date: Jul. 4, 2013

(65) Prior Publication Data
US 2015/0015382 A1    Jan. 15, 2015

(30) Foreign Application Priority Data

Dec. 30, 2011  (FR) ..................... 11 04150

(51) Int. Cl.
*G08B 25/00* (2006.01)
*G06F 3/01* (2006.01)
(Continued)

(52) U.S. Cl.
CPC  *G06F 3/016* (2013.01); *G05G 5/03* (2013.01); *G08B 6/00* (2013.01)

(58) Field of Classification Search
CPC ....... G06F 3/016; G06F 3/017; G06F 3/0426; G06F 3/04886; G05G 5/03; G08B 6/00; H04M 19/047; H04M 1/23; B82Y 35/00; G01N 23/225; G01Q 10/045; G01Q 80/00; H01L 41/0946; H01L 41/0953; H01L 41/0986
USPC ........ 340/407.1, 407.2, 568.1, 568.8, 815.53, 340/815.57, 815.79, 815.83, 815.82
See application file for complete search history.

(56) References Cited

U.S. PATENT DOCUMENTS 6,680,825 B1 * 1/2004 Murphy ............... G11B 5/4833
360/294.4
6,768,613 B1 * 7/2004 Coon ................... G11B 5/4826
360/244.3

(Continued)

FOREIGN PATENT DOCUMENTS

EP    2 187 293 A2    5/2010

OTHER PUBLICATIONS

International Search Report for corresponding International Application No. PCT/FR2012/000545, mailed Mar. 14, 2013 (3 pages).

*Primary Examiner* — Daniel Previl
(74) *Attorney, Agent, or Firm* — Osha Liang LLP

(57) ABSTRACT

The present invention relates to a control device (1) with haptic feedback; comprising a sensitive control surface (3) on which an actuator (9) is fixed, said control surface (3) being connected to a support (5) in the area of at least two connection zones (7), each connection zone (7) comprising at least one damper (70) placed between the control surface (3) and the support (5), said connection zones (7) defining a proximal suspension of said control surface (3) with respect to said support (5) in the area of a connection zone (7) near the actuator (9) and a distal suspension of said control surface (3) with respect to the support (5) in the area of a connection zone (7) distant from the actuator, the stiffness of the proximal suspension being less than the stillness of the distal suspension.

8 Claims, 3 Drawing Sheets

Figure 1:
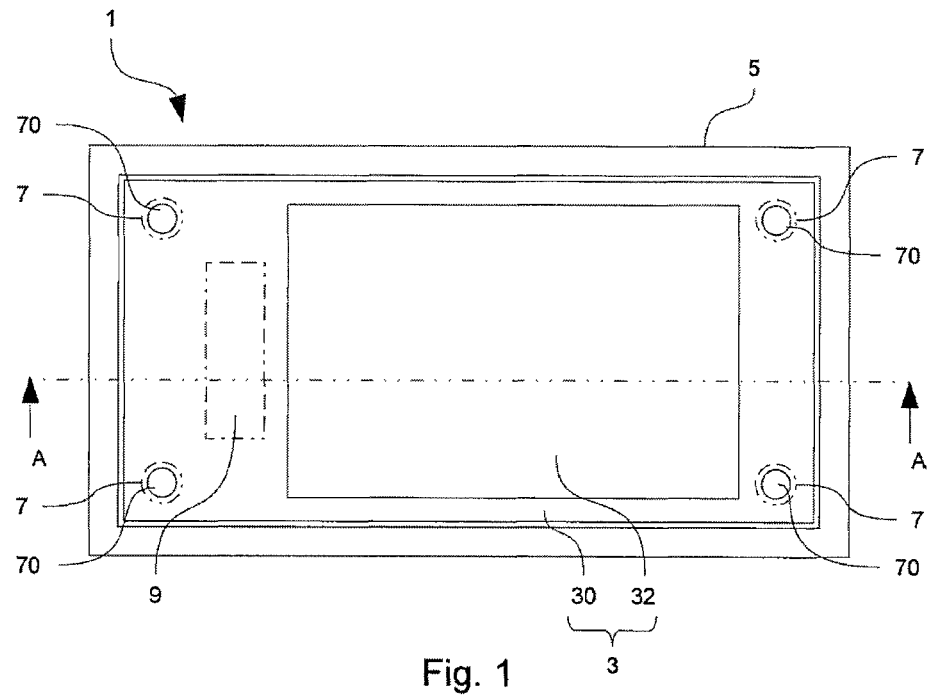

(51) Int. Cl.
*G05G 5/03* (2008.04)
*G08B 6/00* (2006.01)

(56) References Cited

U.S. PATENT DOCUMENTS

| | | | |
|---|---|---|---|
| 8,593,409 B1 * | 11/2013 | Heubel | G06F 3/041 340/407.1 |
| 9,104,271 B1 * | 8/2015 | Adams | G06F 3/0426 |
| 2004/0164971 A1 | 8/2004 | Hayward et al. | |
| 2005/0122317 A1 * | 6/2005 | Schaaf | B60K 35/00 345/173 |
| 2008/0084384 A1 | 4/2008 | Gregorio et al. | |
| 2010/0156818 A1 | 6/2010 | Burrough et al. | |
| 2010/0308982 A1 | 12/2010 | Cooperstock et al. | |
| 2011/0141052 A1 * | 6/2011 | Bernstein | G06F 3/016 345/174 |

* cited by examiner

CONTROL DEVICE WITH HAPTIC FEEDBACK

The present invention relates to a control device in the field of motor vehicles, which is, notably, capable of transmitting a haptic feedback, such as a vibration feedback, to a user.

In the motor vehicle field, multi-function control devices, made for example in the form of a joystick or a rotary knob, are increasingly used to control electrical or electronic systems, such as an air-conditioning system, an audio system, or a navigation system.

These devices may be associated with a display screen and may allow navigation through scrolling menus including various commands relating to the systems to be controlled.

For the greater convenience of users, the use of sensitive surface sensor technology, for example touch panels, on the control surface of these control devices is becoming increasingly common.

When a user exerts a pressure, or simply touches the touch-sensitive surface, the sensor can measure the applied pressure and/or determine the location of the pressure by the application of a suitable voltage. In this case, the user's pressure on the touch-sensitive surface is associated, for example, with the selection of a command.

Additionally, in order to signal to the user that his command has been successfully accepted, notably in night driving or in blind operation, it is important for the user to receive haptic feedback in order to maintain his concentration on the road.

For this purpose, there are known control devices with haptic feedback including actuators, such as electromagnetic actuators, connected to a support plate of the touch-sensitive surface sensor of the control device to transmit a vibratory movement to the touch-sensitive surface, so that the user perceives a haptic feedback that informs him that his command has in fact been accepted.

However, in a desire for economy, it has become increasingly common to use only one actuator for transmitting the haptic feedback to the user. Consequently it is desirable for the transmission of the haptic feedback to take place over the whole surface of the control device. This is because the haptic feedback becomes attenuated as the distance between the user's point of contact with the control device and the location of the actuator increases.

One of the objects of the invention is therefore to overcome, at least partially, the drawbacks of the prior art, and to propose a control device with haptic feedback which is economical and optimized.

The invention therefore relates to a control device with haptic feedback comprising a sensitive control surface to which an actuator is fixed, said control surface being connected to a support in at least two connecting areas, each connecting area comprising at least one damper placed between the control surface and the support, said connecting areas defining a proximal suspension of said control surface on said support in one connecting area near the actuator and a distal suspension of said control surface on the support in a connecting area at a distance from the actuator, the stiffness of the proximal suspension being less than the stiffness of the distal suspension.

According to one aspect of the invention, as the distance between a connecting area and the actuator increases, the coefficient of stiffness of the at least one damper of said connecting area also increases.

According to another aspect of the invention, the control surface extends over a length, and at least two connecting areas extend over the whole of said length, each connecting area including a single damper extending over the whole length, and as the distance between a point of a connecting area and the actuator increases, the thickness of the damper at said point of this connecting area decreases.

According to another aspect of the invention, the dampers of the connecting areas have an identical coefficient of stiffness, and as the distance between a connecting area and the actuator increases, the thickness of the at least one damper of this connecting area decreases.

According to another aspect of the invention, the dampers of the connecting areas have an identical coefficient of stiffness, and as the distance between a connecting area and the actuator increases, the closeness of the joint between the control surface and the support in this connecting area also increases.

According to another aspect of the invention, the dampers of the connecting areas have an identical coefficient of stiffness, and as the distance between a connecting area and the actuator increases, the number of dampers present in said connecting area also increases.

According to another aspect of the invention, the damper or dampers are made of compressible materials such as silicone or foam material.

According to another aspect of the invention, the control surface is a transparent touch panel.

Figure 2:
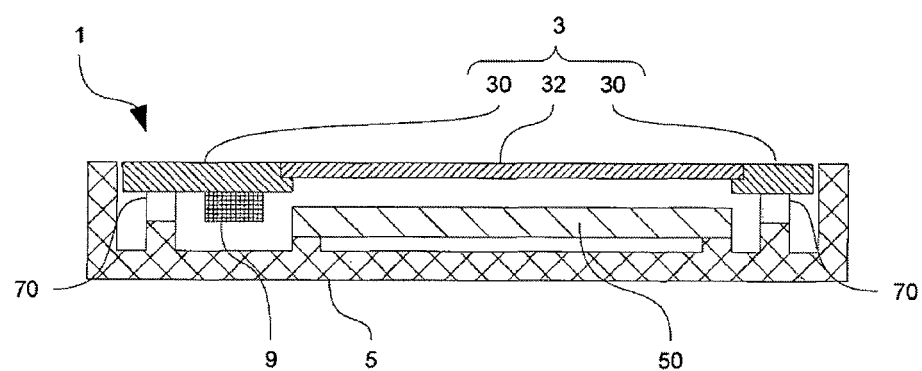
Figure 3:
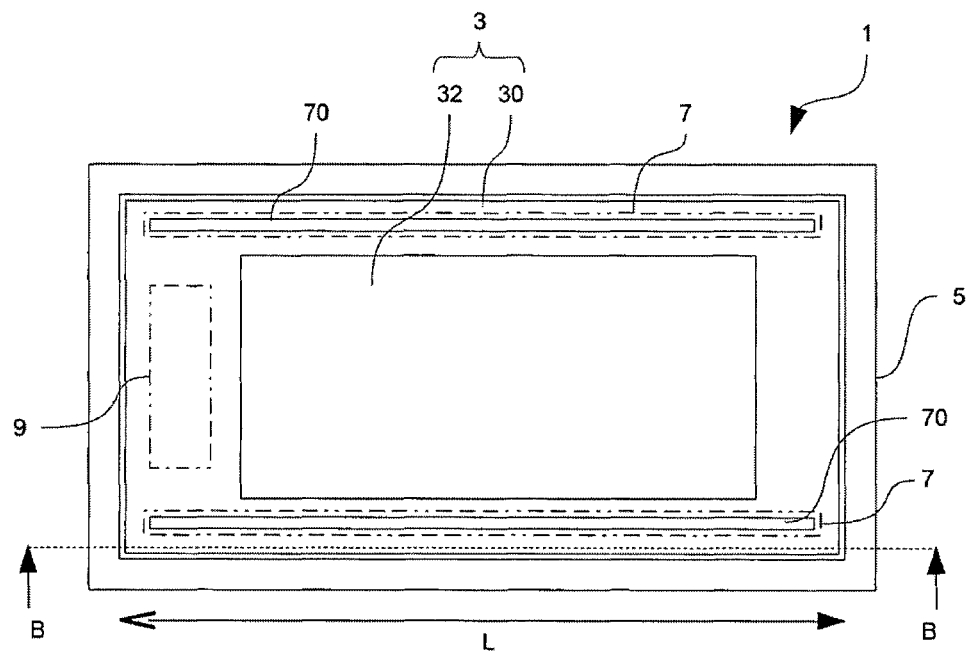
Figure 4:
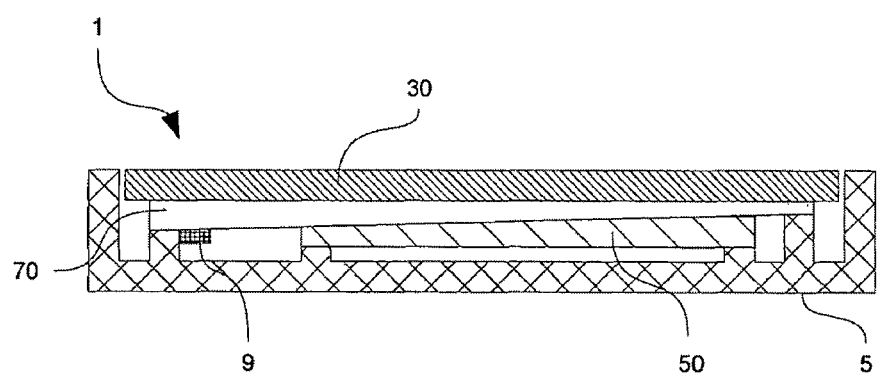
Figure 5:
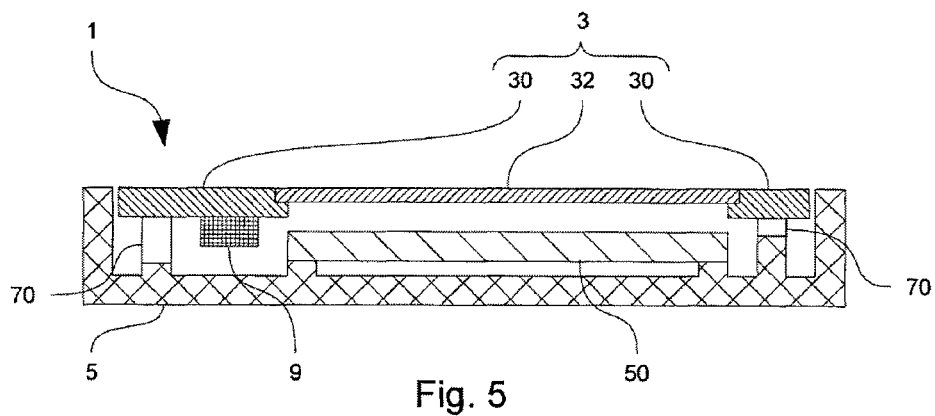
Figure 6:
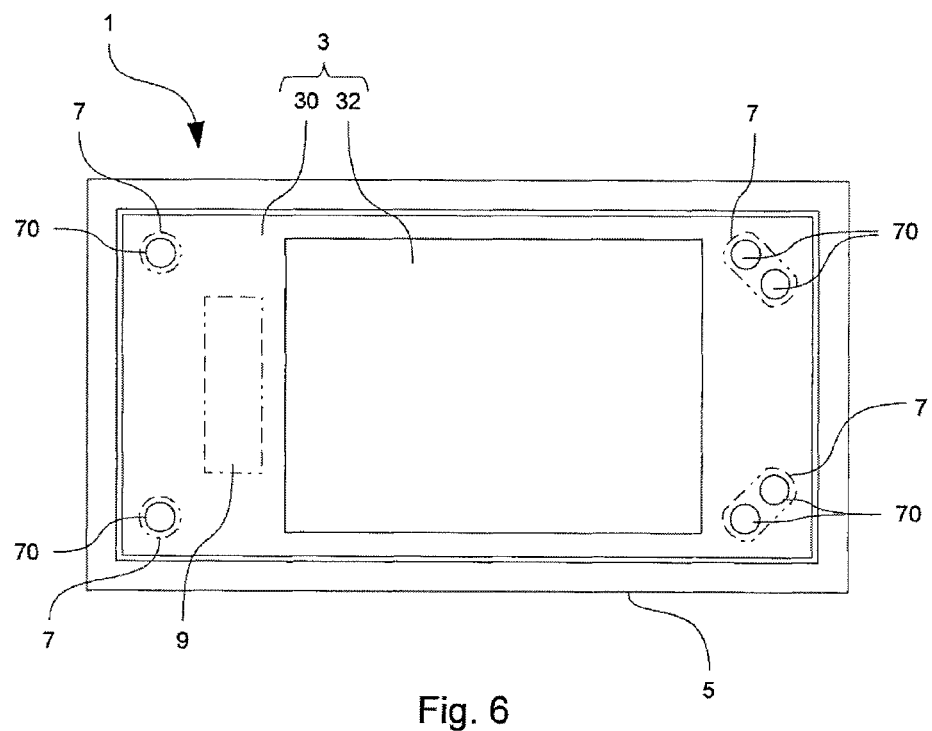

Other characteristics and advantages of the invention will be apparent from the following description, provided by way of non-limiting example, with reference to the attached drawings, of which:

FIG. 1 shows a schematic representation of a control device in a view from above, FIG. 2 shows a schematic representation of a control device in a side view taken through the section AA, FIG. 3 shows a schematic representation of a control device in a view from above according to an alternative embodiment, FIG. 4 shows a schematic representation of a control device in the embodiment of the preceding figure, in a side view taken through the section BB, FIG. 5 shows a schematic representation of a control device in another embodiment, in a side view taken through the section AA, and FIG. 6 shows a schematic representation of a control device in a view from above according to an additional embodiment.

Identical elements in the various figures have been given similar references.

As shown by FIG. 1, in a view from above, and FIG. 2, in a side view taken through the section AA, the control device 1 with haptic feedback includes a sensitive control surface 3 to which an actuator 9 is fixed. The control surface 3 is fixed to a support 5 in at least two connecting areas 7, for example by bonding or by means of screws or clips. Said at least two connecting areas 7 each comprise at least one damper 70 placed between the control surface 3 and the support 5.

Said connecting areas 7, with the dampers 70, thus form the suspension of the control surface 3 on the support 5. The connecting area or areas 7 near the actuator 9 thus form a proximal suspension, and the connecting area or areas 7 farthest from the actuator 9 form a distal suspension. To allow the haptic feedback generated by the actuator 9 to be transmitted over the whole control surface 3, the stiffness of the proximal suspension of said control surface 3 on the support 5 is less than the stiffness of its distal suspension.

The haptic feedback delivered by the actuator 9, for example vibrations perpendicular to the touch panel 32, is transmitted over the whole surface of the control surface 3. The fact that the distal suspension is stiffer than the proximal suspension enables said vibrations to be amplified in the connecting areas 7 farthest from the actuator 9. This amplification thus provides compensation for the natural attenuation of the vibrations due to the distance travelled in the control surface 3 from the actuator 9. However, it is essential to calibrate the stiffness of the proximal suspension correctly as a function of the mass of the control surface 3, so that it can efficiently transmit the vibrations of the actuator 9, with optimum perception of the haptic feedback by the user.

Preferably, the dampers 70 are made of compressible materials such as silicone or foam material.

In the embodiment shown in these FIGS. 1 and 2, the control surface 3 is a transparent rectangular touch panel 32, which may be either resistive or capacitive, framed by a support frame 30 to which the actuator 9 is fixed. The fact that the actuator 9 is fixed directly to the support frame 30 may also save space. The transparent touch panel 32 surmounts a display screen, for example a thin film transistor (TFT) liquid crystal screen or a light-emitting diode (LED) screen, and is fixed to the support 5 in four connecting areas 7 located at the four corners of the support frame 30.

In this embodiment, in order to have a distal suspension which is stiffer than the proximal suspension, the coefficient of stiffness of the dampers 70 located in the connecting areas 7 nearest to the actuator 9, defining the stiffness of the proximal suspension, is lower than the coefficient of stiffness of the dampers 70 located in the connecting areas 7 farthest from the actuator 9, defining the stiffness of the distal suspension. Thus, as the distance between a connecting area 7 and the actuator 9 increases, the coefficient of stiffness of the damper or dampers 70 of this connecting area 7 also increases.

FIG. 3, in a view from above, and FIG. 4, in a side view taken through the section BB, show an alternative embodiment of a control device 1 according to the invention. In this embodiment, the control surface 3, which may also include a touch panel 32 framed in a support frame 30, extends over a length L. Said control surface 3 is connected to the support 5 in two connecting areas 7 which also extend over the length L of the control surface 3.

To enable the stiffness of the proximal suspension to be less than the stiffness of the distal suspension, the two connecting areas 7 each have a damper 70 whose thickness, and therefore whose stiffness, varies as a function of the distance from the actuator 9. Thus, as the distance between a connecting area 7 and the actuator 9 increases, the thickness of the damper 9 at said point decreases.

FIG. 5 shows, in a side view taken through the section AA of FIG. 1, another embodiment in which all the dampers 70, regardless of the connecting areas 7 in which they are located, have an identical coefficient of stiffness. To enable the proximal suspension to be weaker than the distal suspension, as the distance between a connecting area 7 and the actuator 9 increases, the thickness of the damper 70 in this connecting area 7 decreases. Thus the damper or dampers 70 of the connecting areas 7 distant from the actuator 9 are less thick than the damper or dampers 70 of the connecting areas 7 near the actuator 9.

In an additional embodiment (not shown), in the case in which the dampers 70 have a similar coefficient of stiffness, the closeness of the joint between the control surface 3 and the support 5 at the connecting areas 7 is made to vary. Thus, as the distance between a connecting area 7 and the actuator 9 increases, the closeness of the joint between the control surface 3 and the support 5 increases, thereby automatically increasing the stiffness of the suspension in this connecting area 7. This is because, in the case where the control surface 3 is fixed to the support 5 by screwing or clipping, a greater closeness of the joint between these two elements causes a greater compression of the damper 70 and thereby automatically increases its stiffness. Thus it would be feasible to provide a joint closeness causing a compression of the dampers 70 of about 10% of the total thickness in the connecting areas 7 near the actuator 9, and about 30% of the total thickness in the connecting areas 7 distant from the actuator 9.

FIG. 6 shows another embodiment of a control device 1 in which the stiffness of the proximal suspension is less than the stiffness of the distal suspension. In this embodiment, the dampers 70 again have a similar coefficient of stiffness, but as the distance between a connecting area 7 and the actuator (9) increases, the number of dampers 70 present in the connecting area 7 also increases. Thus, as in the example shown in FIG. 6, the connecting areas 7 near the actuator 9 may each have only one damper 70, whereas the connecting areas 7 distant from the actuator 9 each have two dampers 70.

Clearly, it is entirely possible to use the embodiments described above for types of control surface 3 other than a transparent touch panel 32. They may be used, notably, in the case of a sensitive control area of a control panel, for example a sensitive switch or pressure switch, or in the case of a touch pad.

It can therefore be seen that, even though there is only a single actuator 9, the transmission of the haptic feedback over the whole surface of said control surface 3 can be optimized by modulating the suspension stiffness of the control surface 3.

The invention claimed is:

1. A control device with haptic feedback, comprising:
a sensitive control surface to which an actuator is fixed, said control surface being connected to a support in at least two connecting areas, each connecting area comprising at least one damper placed between the control surface and the support, said connecting areas defining a proximal suspension of said control surface on said support in one connecting area near the actuator and a distal suspension of said control surface on the support in a connecting area at a distance from the actuator,
wherein the stiffness of the proximal suspension is less than the stiffness of the distal suspension.

2. The control device as claimed in claim 1, wherein, as the distance between a connecting area and the actuator increases, the coefficient of stiffness of the at least one damper of said connecting area also increases.

3. The control device as claimed in claim 1, wherein the control surface extends over a length, in that at least two connecting areas extend over the whole of said length, each connecting area including a single damper extending over the whole length, and wherein as the distance between a point of a connecting area and the actuator increases, the thickness of the damper at said point of this connecting area decreases.

4. The control device as claimed in claim 1, wherein the dampers of the connecting areas have an identical coefficient of stiffness, and wherein, as the distance between a connecting area and the actuator increases, the thickness of the at least one damper of this connecting area decreases.

5. The control device as claimed in claim 1, wherein the dampers of the connecting areas have an identical coefficient of stiffness, and wherein, as the distance between a connecting area and the actuator increases, the closeness of the joint between the control surface and the support in said connecting area also increases.

6. The control device as claimed in claim 1, wherein the dampers of the connecting areas have an identical coefficient of stiffness, and wherein, as the distance between a connecting area and the actuator increases, the number of dampers present in said connecting area also increases.

7. The control device as claimed in claim 1, wherein the dampers are made of compressible materials such as silicone or foam material.

8. The control device as claimed in claim 1, wherein the control surface is a transparent touch panel.

* * * * *